(12) United States Patent
Li et al.

(10) Patent No.: US 8,917,047 B2
(45) Date of Patent: Dec. 23, 2014

(54) CONVERTER SYSTEM

(75) Inventors: Lin Li, Taoyuan Hsien (TW); Jing-Tao Tan, Taoyuan Hsien (TW); Hong-Yang Wu, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 241 days.

(21) Appl. No.: 13/562,904

(22) Filed: Jul. 31, 2012

(65) Prior Publication Data

US 2013/0234641 A1 Sep. 12, 2013

(30) Foreign Application Priority Data

Mar. 9, 2012 (CN) .......................... 2012 1 0066923

(51) Int. Cl.
*H02P 3/00* (2006.01)
*H02P 1/30* (2006.01)

(52) U.S. Cl.
USPC .................. 318/503; 318/400.21; 318/400.3; 318/490; 363/37; 363/40

(58) Field of Classification Search
USPC ......... 318/400.21, 400.3, 800, 801, 440, 490, 318/503; 363/37, 40, 65
See application file for complete search history.

(56) References Cited

U.S. PATENT DOCUMENTS

| | | | | | |
|---|---|---|---|---|---|
| 3,781,615 | A | * | 12/1973 | Mokrytzki et al. | 318/801 |
| 4,349,772 | A | * | 9/1982 | Weiss | 318/799 |
| 4,536,692 | A | * | 8/1985 | Godfroid | 318/723 |
| 4,849,870 | A | * | 7/1989 | Heinrich | 363/37 |
| 5,460,244 | A | * | 10/1995 | Tanahashi | 187/293 |
| 5,629,844 | A | * | 5/1997 | Krichtafovitch et al. | 363/65 |
| 5,737,197 | A | * | 4/1998 | Krichtafovitch et al. | 363/17 |
| 5,852,554 | A | * | 12/1998 | Yamamoto | 363/71 |
| 6,281,664 | B1 | * | 8/2001 | Nakamura et al. | 322/22 |
| 6,813,167 | B2 | * | 11/2004 | Nakamura et al. | 363/40 |
| 6,873,157 | B2 | * | 3/2005 | Smedley et al. | 324/432 |
| 6,954,366 | B2 | * | 10/2005 | Lai et al. | 363/71 |
| 6,977,449 | B2 | * | 12/2005 | Miettinen | 307/73 |
| 7,327,588 | B2 | * | 2/2008 | Ollila | 363/71 |
| 7,405,494 | B2 | * | 7/2008 | Tassitino et al. | 307/45 |
| 7,638,899 | B2 | * | 12/2009 | Tracy et al. | 307/65 |
| 7,773,396 | B2 | * | 8/2010 | Ollila et al. | 363/72 |
| 7,960,865 | B2 | * | 6/2011 | Jahkonen | 307/82 |

(Continued)

FOREIGN PATENT DOCUMENTS

| | | |
|---|---|---|
| TW | 496030 | 7/2002 |
| TW | 588504 | 5/2004 |
| TW | 595268 | 6/2004 |
| TW | 201216604 | 4/2012 |

*Primary Examiner* — Paul Ip
(74) *Attorney, Agent, or Firm* — Lowe Hauptman & Ham, LLP

(57) ABSTRACT

The present disclosure discloses a converter system, which at least includes the first and second back-to-back converters. The first back-to-back converter includes a first rectifier module and a first inverter module. The first rectifier module is used to convert a first AC voltage to a first DC voltage. The first inverter module is used to convert the first DC voltage to a second AC voltage. The second back-to-back converter includes a second rectifier module and a second inverter module. The second rectifier module is used to convert the first AC voltage to a second DC voltage. The second inverter module is used to convert the second DC voltage to the second AC voltage. The converter system can suppress the circular current through the synchronous operation of the first and second rectifiers or the synchronous operation of the first and second inverters.

41 Claims, 11 Drawing Sheets

(56) References Cited

U.S. PATENT DOCUMENTS

| | | | |
|---|---|---|---|
| 8,127,894 B2* | 3/2012 | Agirman et al. | 187/290 |
| 8,400,092 B2* | 3/2013 | Kasunich et al. | 318/490 |
| 8,400,791 B2* | 3/2013 | Campbell et al. | 363/34 |
| 8,487,568 B2* | 7/2013 | Franke | 318/400.3 |
| 8,575,882 B2* | 11/2013 | Radosevich | 318/800 |
| 2003/0025398 A1* | 2/2003 | Nakamura et al. | 307/72 |
| 2005/0018459 A1* | 1/2005 | Miettinen | 363/136 |
| 2005/0111245 A1* | 5/2005 | Lai et al. | 363/125 |
| 2005/0179419 A1* | 8/2005 | Ollila | 318/801 |
| 2006/0006741 A1* | 1/2006 | Tassitino et al. | 307/82 |
| 2007/0210652 A1* | 9/2007 | Tracy et al. | 307/66 |
| 2008/0073978 A1* | 3/2008 | Ollila et al. | 307/82 |
| 2008/0265680 A1* | 10/2008 | Marwali et al. | 307/65 |
| 2009/0134828 A1* | 5/2009 | Chakrabarti et al. | 318/440 |
| 2009/0251933 A1* | 10/2009 | Angerer et al. | 363/71 |
| 2009/0284079 A1* | 11/2009 | Jahkonen | 307/82 |
| 2009/0301819 A1* | 12/2009 | Agirman et al. | 187/290 |
| 2010/0102636 A1* | 4/2010 | Tracy et al. | 307/80 |
| 2010/0277001 A1* | 11/2010 | Wagoner | 307/82 |
| 2012/0013283 A1* | 1/2012 | Tallam et al. | 318/400.26 |
| 2012/0013284 A1* | 1/2012 | Campbell | 318/490 |
| 2012/0013285 A1* | 1/2012 | Kasunich et al. | 318/490 |
| 2012/0013372 A1* | 1/2012 | Campbell et al. | 327/141 |
| 2012/0014147 A1* | 1/2012 | Radosevich | 363/71 |
| 2013/0154529 A1* | 6/2013 | Kasunich et al. | 318/400.21 |
| 2013/0155746 A1* | 6/2013 | Campbell et al. | 363/131 |

* cited by examiner

CONVERTER SYSTEM

RELATED APPLICATIONS

This application claims priority to China Application Serial Number 201210066923.8, filed Mar. 9, 2012, which is herein incorporated by reference.

BACKGROUND

1. Field of Invention

The present disclosure relates to the field of new energy technology and the field of power electronic technology. More particularly, the present disclosure relates to a converter system applied in the area of new energy technology.

2. Description of Related Art

With the ever-increasing seriousness of energy-related issues in recent times, the development of new energy technology is gradually gaining the attention of those involved in research and development in various fields. While the capacity of power generation systems is becoming larger and larger, faced with capacity bottlenecks of modern electronic components, it is not easy to transmit a large amount of power energy to an electric grid through only a single converter.

In order to solve the problems mentioned above, the conventional parallel inverter technology, which can significantly increase the total current without increasing the current stress of a single power switch, is gradually becoming an active area of research and development. This has eventually led to research and development with respect to a converter product having a high power grade. In general, under a given input power, by using parallel technology, a power switch having a low power grade is used so as to reduce production costs. However, it should be pointed out that in a single converter system since there is no zero-sequence circulation channel, no problem of circular current is caused. Nevertheless, in multiple converter systems which are connected in parallel, once there is a circulation channel, a serious problem of circular current is caused. The circular current only flowing among parallel connected converters not only increases system loss, but also reduces system efficiency, so that a large amount of heat is generated in the switch and even more seriously the switch is burned. Furthermore, the circular current also causes unbalancing current, so that the current stress applied on the power switch is not balanced, which reduces the usage life of the power switch and limits the increased capacity of the total system. Moreover, the circular current also results in distortion of the three-phase current and increases the total harmonic distortion (THD), so that the grid connection of the system is not easily realized.

To eliminate the circular current of a converter system, a traditional solution involves eliminating the circulation channel using a hardware solution. For example, an isolation transformer may be arranged between a generator-side converter and a motor so as to eliminate the circulation channel. Also for example, when the DC buses of the two converters are connected in parallel, an isolation transformer may be arranged between the generator-side converter and the motor, and also between the grid-side converter and the grid. Another solution involves selecting a motor having a certain number of phases (such as a six-phase motor) and subsequently eliminating the circulation channel through electric isolation (equivalent to an isolation transformer) between two three-phase windings of the six-phase motor. However, in the above mentioned solutions the isolation transformer has a large volume, which not only increases the cost of the system, but also greatly reduces the power density of the system. A further solution involves special requirements for the motor during elimination of the circulation channel. However, such solution can not be used in different situations.

In view of this, skilled in the art are endeavoring to find ways in which to design a novel converter system, so as to effectively solve the problem of circular current when multiple converter systems are connected in parallel to thereby increase the reliability of the system and reduce the cost of the system.

SUMMARY

In one embodiment, a converter system is provided. The converter system at least includes a first back-to-back converter and a second back-to-back converter. The first back-to-back converter includes a first rectifier module and a first inverter module. The second back-to-back converter includes a second rectifier module and a second inverter module.

The first rectifier module includes a first rectifier and a first controller. The first rectifier has an input side and an output side, so as to convert a first alternative current (hereinafter referred to as "AC") voltage to a first direct current (hereinafter referred to as "DC") voltage. The first rectifier is controlled by the first controller. The first inverter module includes a first inverter and a third controller. The first inverter has an input side and an output side, so as to invert the first DC voltage to a second AC voltage. The first inverter is controlled by the third controller.

The second rectifier module includes a second rectifier and a second controller. The second rectifier has an input side and an output side, so as to convert the first AC voltage to a second DC voltage. The second rectifier is controlled by the second controller. The input side of the second rectifier is connected to the input side of the first rectifier in parallel. The second inverter module includes a second inverter and a fourth controller. The second inverter has an input side and an output side, so as to invert the second DC voltage to the second AC voltage. The second inverter is controlled by the fourth controller. The output side of the second inverter is connected to the output side of the first inverter in parallel. The first and second rectifiers have a rectifier frequency. The first and second inverters have an inverter frequency. The converter system suppresses the circular current through the synchronous operation of the first and second rectifiers or through the synchronous operation of the first and second inverters.

In one embodiment, a converter system is provided. The converter system at least includes a first back-to-back converter and a second back-to-back converter. The first back-to-back converter includes a first rectifier module and a first inverter module.

The first rectifier module includes a first rectifier and a first controller. The first rectifier has an input side and an output side, so as to convert a first AC voltage to a first DC voltage. The first rectifier is controlled by the first controller. The first inverter module includes a first inverter and a third controller. The first inverter has an input side and an output side, so as to invert the first DC voltage to a second AC voltage. The first inverter is controlled by the third controller. The second back-to-back converter includes a second rectifier module and a second inverter module.

The second rectifier module includes a second rectifier and a second controller. The second rectifier has an input side and an output side, so as to convert the first AC voltage to a second DC voltage. The second rectifier is controlled by the second controller. The input side of the second rectifier is connected to the input side of the first rectifier in parallel. The second inverter module includes a second inverter and a fourth controller. The second inverter has an input side and an output side, so as to invert the second DC voltage to the second AC voltage. The second inverter is controlled by the fourth controller. The output side of the second inverter is connected to the output side of the first inverter in parallel. The converter system suppresses the circular current simultaneously through the synchronous operation of the first and second rectifiers and through the synchronous operation of the first and second inverters.

BRIEF DESCRIPTION OF THE DRAWINGS

In order to make the foregoing as well as other aspects, features, advantages, and embodiments of the present disclosure more apparent, the accompanying drawings are described as follows.

DETAILED DESCRIPTION

Figure 1:
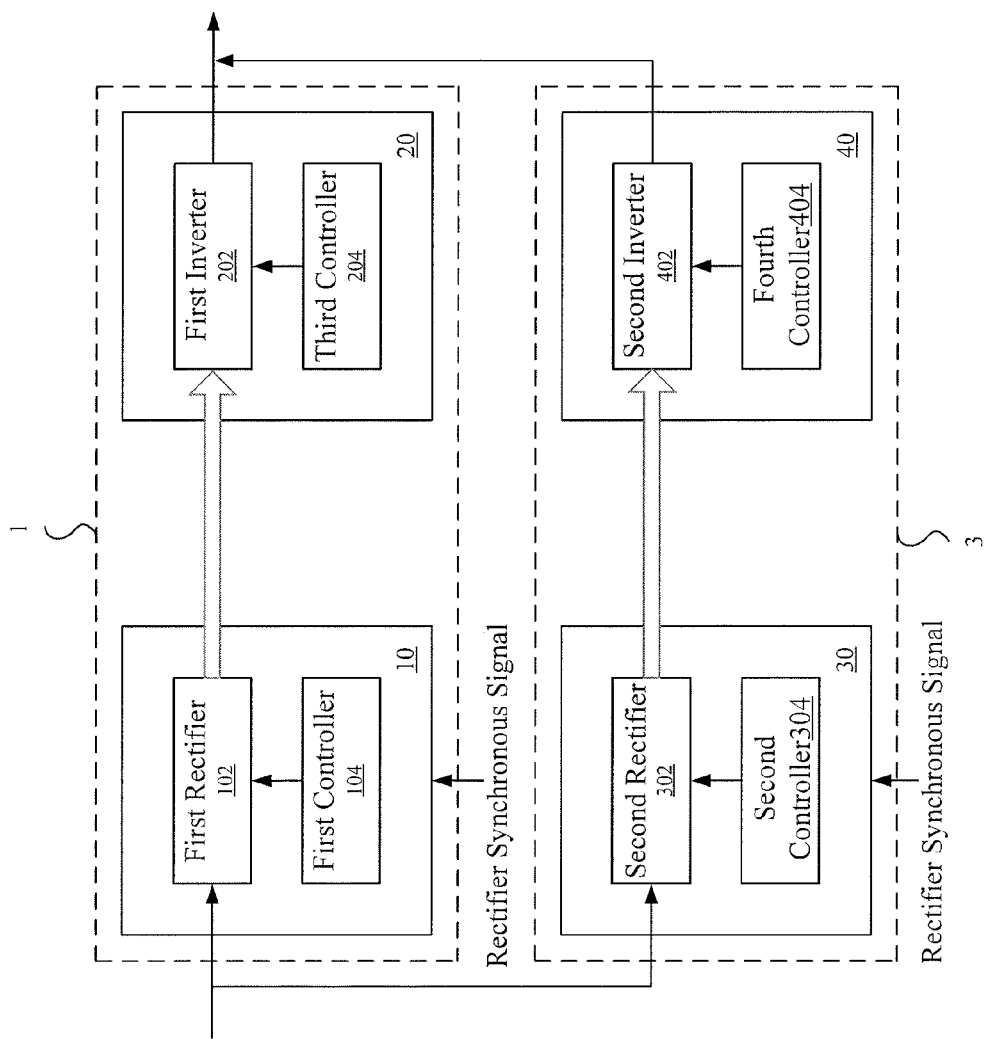
FIG. 1 illustrates a block diagram of a converter system according to an illustrative embodiment.

In order to make the description of the present disclosure more detailed and more comprehensive, various embodiments are described below with reference to the accompanying drawings. The same reference numbers are used in the drawings to refer to the same or like elements. However, those skilled in the art should understand that the embodiments described below are not used for limiting the scope of the present disclosure. Moreover, the accompanying drawings are only illustrative and are not made according to actual size.

As previously mentioned, the conventional parallel inverter technology, which can significantly increase the total current without increasing the current stress of a single power switch, is gradually becoming an active area of research and development. For example, under a given input power, through parallel technology a power switch having a low power grade is used so as to reduce the manufacturing cost of the product. However, when converters are connected in parallel, circulation channels which can result in serious circulation problems are often caused, which not only increases system loss, but also reduces system efficiency. Furthermore, the circular current also causes unbalancing current, so that the current stress applied on the power switch is not balanced, which reduces the usage life of the power switch. Moreover, the circular current also results in distortion of the three-phase current and increases the total harmonic distortion (THD), so that the grid connection of the system is not easily realized.

In order to overcome at least one part of disadvantages mentioned above, FIG. 1 illustrates a block diagram of a converter system according to an illustrative embodiment. Referring to FIG. 1, the converter system at least includes back-to-back converters 1 and 3. The back-to-back converter 1 includes a rectifier module 10 and an inverter module 20. The back-to-back converter 3 includes a rectifier module 30 and an inverter module 40. It should be understood that in other embodiments, the converter system may include more than two back-to-back converters, and in each back-to-back converter, the AC sides of all rectifier modules are connected in parallel, and the AC sides of all inverter modules are connected in parallel.

The rectifier module 10 includes a rectifier 102 and a controller 104. The rectifier 102 has an input side and an output side, so as to convert a first AC voltage to a first DC voltage. The controller 104 is connected to the rectifier 102, so as to control the rectifier 102. For example, the controller 104 sends a PWM control signal, so as to control the power switch of the rectifier 102 to turn on and off. The inverter module 20 includes an inverter 202 and a controller 204. The inverter 202 has an input side and an output side, so as to invert the first DC voltage to a second AC voltage. The controller 204 is connected to the inverter 202, so as to control the inverter 202. For example, the controller 204 sends a PWM control signal, so as to control the power switch of the inverter 202 to turn on and off. In an embodiment, the controller 104 of the rectifier module 10 and the controller 204 of the inverter module 20 are both digital signal processors (DSPs).

Similarly, the rectifier module 30 of the back-to-back converter 3 includes a rectifier 302 and a controller 304. The rectifier 302 has an input side and an output side, so as to convert the first AC voltage to a second DC voltage. The input side of the rectifier 302 is connected to the input side of the rectifier 102 in parallel. The controller 304 is connected to the rectifier 302, so as to control the rectifier 302. For example, the controller 304 sends a PWM control signal, so as to control the power switch of the rectifier 302 to turn on and off. The inverter module 40 of the back-to-back converter 3 includes an inverter 402 and a controller 404. The inverter 402 has an input side and an output side, so as to invert the second DC voltage to the second AC voltage. The output side of the inverter 402 is connected to the output side of the inverter 202 in parallel. The controller 404 is connected to the inverter 402, so as to control the inverter 402. For example, the controller 404 sends a PWM control signal, so as to control the power switch of the inverter 402 to turn on and off. In an embodiment, the controller 304 of the rectifier module 30 and the controller 404 of the inverter module 40 are both digital signal processors (DSPs).

In order to solve the circular current problem, the converter system suppresses the circular current through the synchronous operation of rectifiers 102 and 302. For example, the converter system eliminates the circulation channel therein through a rectifier synchronous signal that is inputted to the side of the rectifier module 10 and the side of the rectifier module 30, as shown in FIG. 1.

It should be understood that the converter system of the present disclosure is capable of two-way energy transmission. That is, when rectifier 102 and 302 of the back-to-back converters 1 and 3 are electrically connected to a different source (e.g., a motor) or load (e.g., an electric grid), the energy transmission is different. In some embodiments, the rectifier 102 and the rectifier 302 are electrically connected to a power generator, and the inverter 202 and the inverter 402 are electrically connected to an AC grid, so as to transmit the electrical energy generated by the power generator to the AC grid. In some embodiments, the rectifier 102 and the rectifier 302 are electrically connected to an AC grid, and the inverter 202 and the inverter 402 are electrically connected to a power generator, so as to transmit the electrical energy from the AC grid to the power generator. Furthermore, the power generator is either a three-phase motor or a multiple-phase motor, and the converter system of the present disclosure is not limited to application in a certain motor type.

Figure 2:
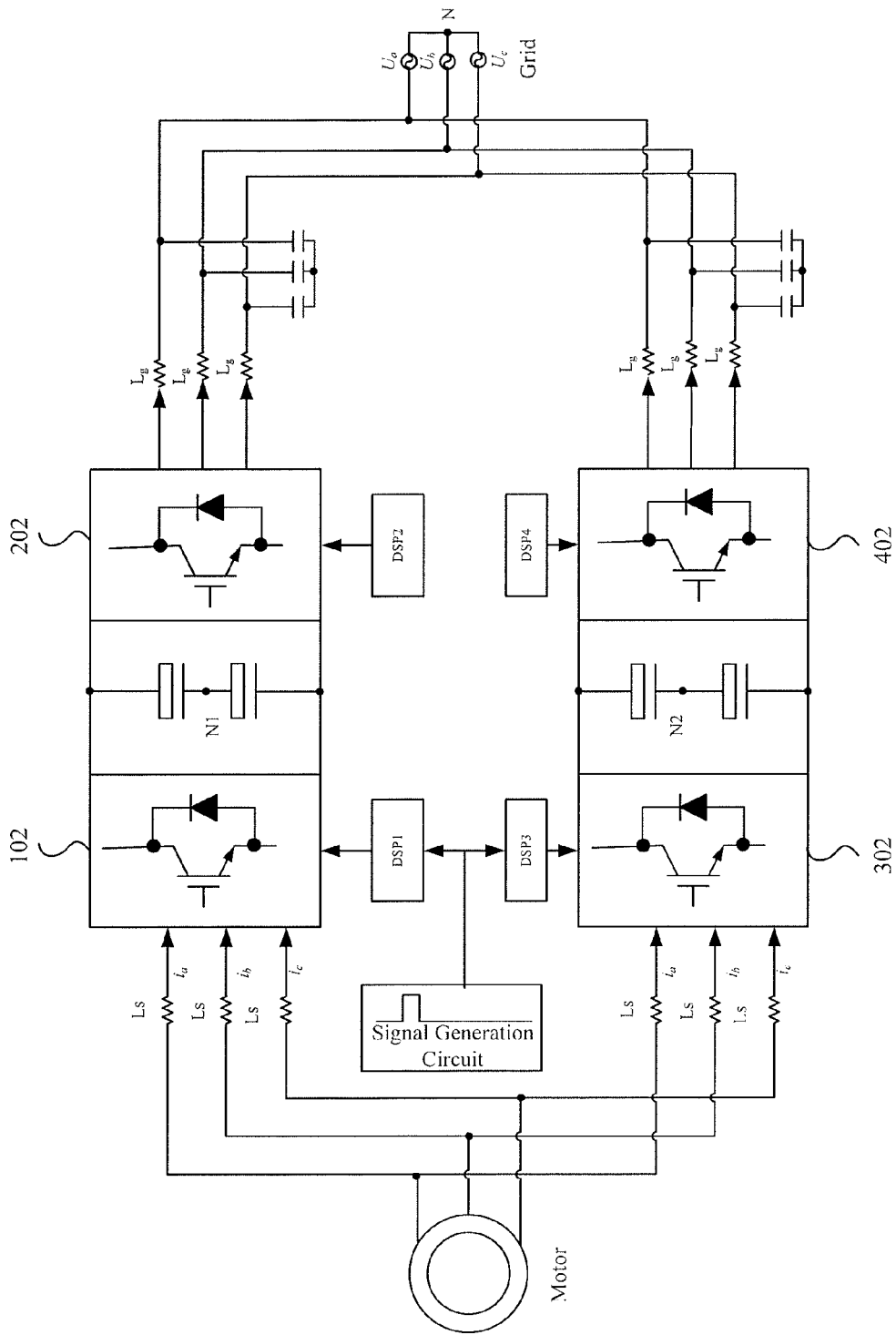
FIG. 2 illustrates a schematic circuit diagram of the converter system in FIG. 1.

FIG. 2 illustrates a schematic circuit diagram of an embodiment of the converter system of FIG. 1. Referring to FIG. 2, the rectifiers 102 and 302 have a rectifier frequency, and the inverters 202 and 402 have an inverter frequency. When the rectifier frequency is smaller than the inverter frequency, the rectifier modules 10 and 30 receive the rectifier synchronous signal, so as to suppress or eliminate the circular current according to the rectifier synchronous signal.

In FIG. 2, the controller DSP1 is used to control the power switch of the rectifier 102 to turn on or turn off, the controller DSP2 is used to control the power switch of the inverter 202 to turn on or turn off, the controller DSP3 is used to control the power switch of the rectifier 302 to turn on or turn off, and the controller DSP4 is used to control the power switch of the inverter 402 to turn on or turn off. A filter inductance Ls is further arranged at each input side of the rectifiers 102 and 302 at the motor side, and a filter inductance Lg is further arranged at each output side of the inverters 202 and 402 at the grid side. The filter inductances Ls and Lg not only perform a filtering function, but also prevent a short circuit of the DC bus between the rectifier 102 and the inverter 202, and between the rectifier 302 and the inverter 402.

In an illustrative embodiment, the converter system further includes a signal generation circuit. When the rectifier frequency is smaller than the inverter frequency, the signal generation circuit is used to generate a rectifier synchronous signal. For example, each of the PWM carrier generator of the controller DSP1 and the PWM carrier generator of the controller DSP3 receives the rectifier synchronous signal from the signal generation circuit, and thereby output a synchronous PWM carrier signal, such that the rectifiers 102 and 302 operate synchronously. In some embodiments, the signal generation circuit is a differential circuit, a 555 circuit or other circuit which can generate a synchronous pulse signal.

In another illustrative embodiment, when the rectifier frequency is smaller than the inverter frequency, the controller DSP1 or the controller DSP3 itself generates the rectifier synchronous signal for suppressing the circular current. For example, the controller DSP1 generates and sends a rectifier synchronous signal to the controller DSP3. Each of the PWM carrier generator of the controller DSP1 and the PWM carrier generator of the controller DSP3 outputs a synchronous PWM carrier signal according to the rectifier synchronous signal, so that the rectifier 102 and the rectifier 302 operate synchronously. Also for example, the controller DSP3 generates and sends a rectifier synchronous signal to the controller DSP1. Each of the PWM carrier generator of the controller DSP1 and the PWM carrier generator of the controller DSP3 outputs a synchronous PWM carrier signal according to the rectifier synchronous signal, so that the rectifier 102 and the rectifier 302 operate synchronously.

In a further embodiment, the back-to-back converter 1 includes a DC bus storage unit (e.g., a capacitor) for storing the first DC voltage, which is arranged between the rectifier 102 and the inverter 202. The back-to-back converter 3 also includes a DC bus storage unit for storing the second DC voltage (e.g., a capacitor), which is arranged between the rectifier 302 and the inverter 402. Furthermore, the DC bus storage unit of the back-to-back converter 1 is either separate from or connected in parallel to the DC bus storage unit of the back-to-back converter 3. For example, the positive buses of the two DC bus storage units are connected with each other, and the negative buses of the two DC bus storage units are also connected with each other. The value of the first DC voltage is the same as that of the second DC voltage.

Figure 3:
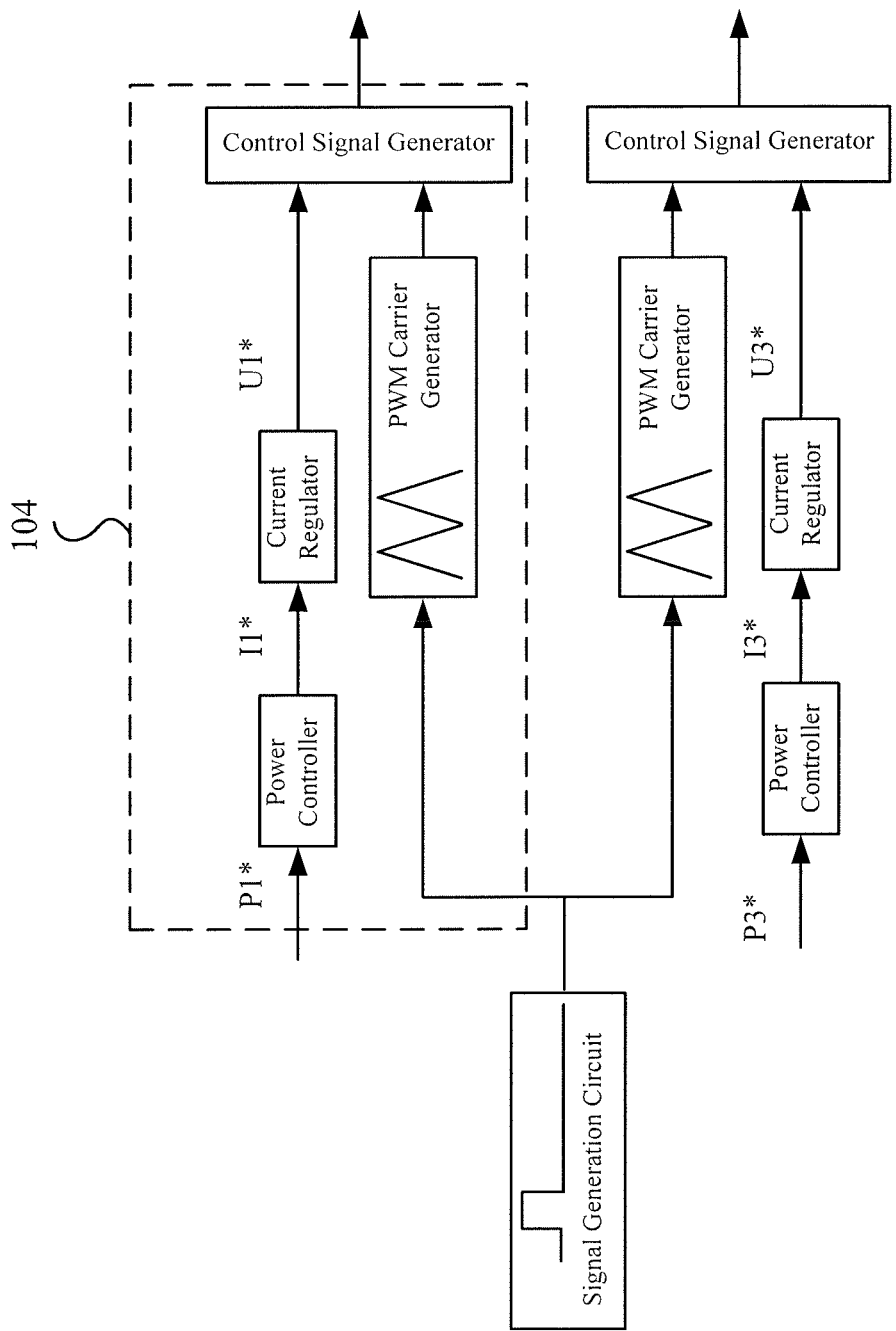
FIG. 3 illustrates a controller in a rectifier module of the converter system in FIG. 2.

FIG. 3 illustrates a controller in a rectifier module of the converter system in FIG. 2. Referring to FIG. 3, the controller 104 includes a power controller, a current regulator and a control signal generator. More particularly, the power controller is used to receive a parameter reflecting the AC power (such as a power P1*, torque and rotation rate of the motor) and output a current reference signal I1*. The current regulator receives the current reference signal I1* and outputs a voltage reference signal U1* corresponding to the current reference signal I1*. The control signal generator has two input terminals and an output terminal. One of the two input terminals is used to receive the voltage reference signal U1* and the other is used to receive the synchronous PWM carrier signal outputted by the PWM carrier generator, and subsequently the output terminal outputs a PWM control signal. The PWM control signal is based on a comparison result between the received voltage reference signal U1* and the synchronous PWM carrier signal.

Similarly, the controller 304 also includes a power controller, a current regulator and a control signal generator. More particularly, the power controller is used to receive a parameter reflecting the AC power (such as a power P3*, torque and rotation rate of the motor) and output a current reference signal I3*. The current regulator receives the current reference signal I3* and outputs a voltage reference signal U3* corresponding to the current reference signal I3*. The control signal generator has two input terminals and an output terminal. One of the two input terminals is used to receive the voltage reference signal U3* and the other is used to receive the synchronous PWM carrier signal outputted by the PWM carrier generator, and subsequently the output terminal output a PWM control signal. The PWM control signal is based on a comparison result between the received voltage reference signal U3* and the synchronous PWM carrier signal.

Figure 4A:
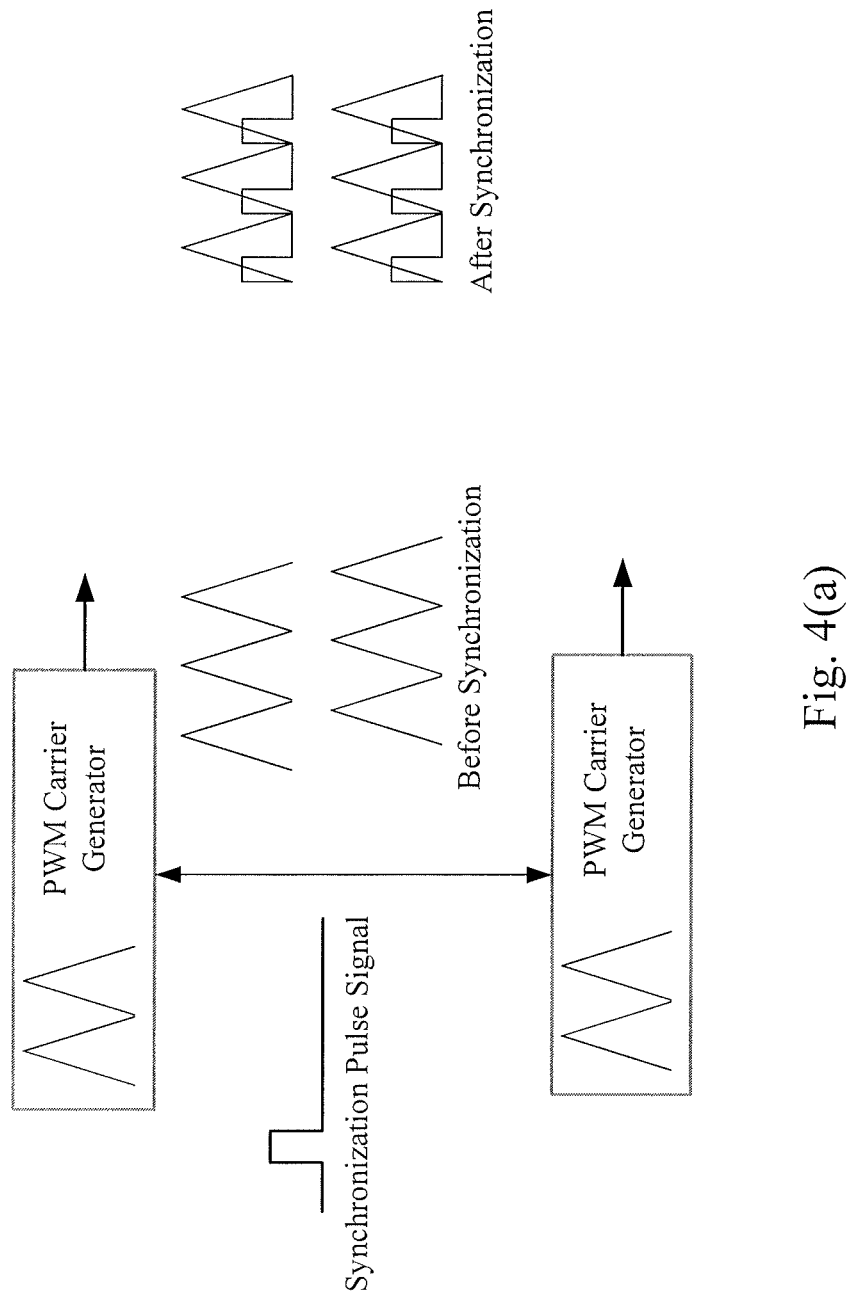
FIG. 4(a) illustrates a schematic waveform chart of a PWM carrier before and after synchronization according to an embodiment.
Figure 4B:
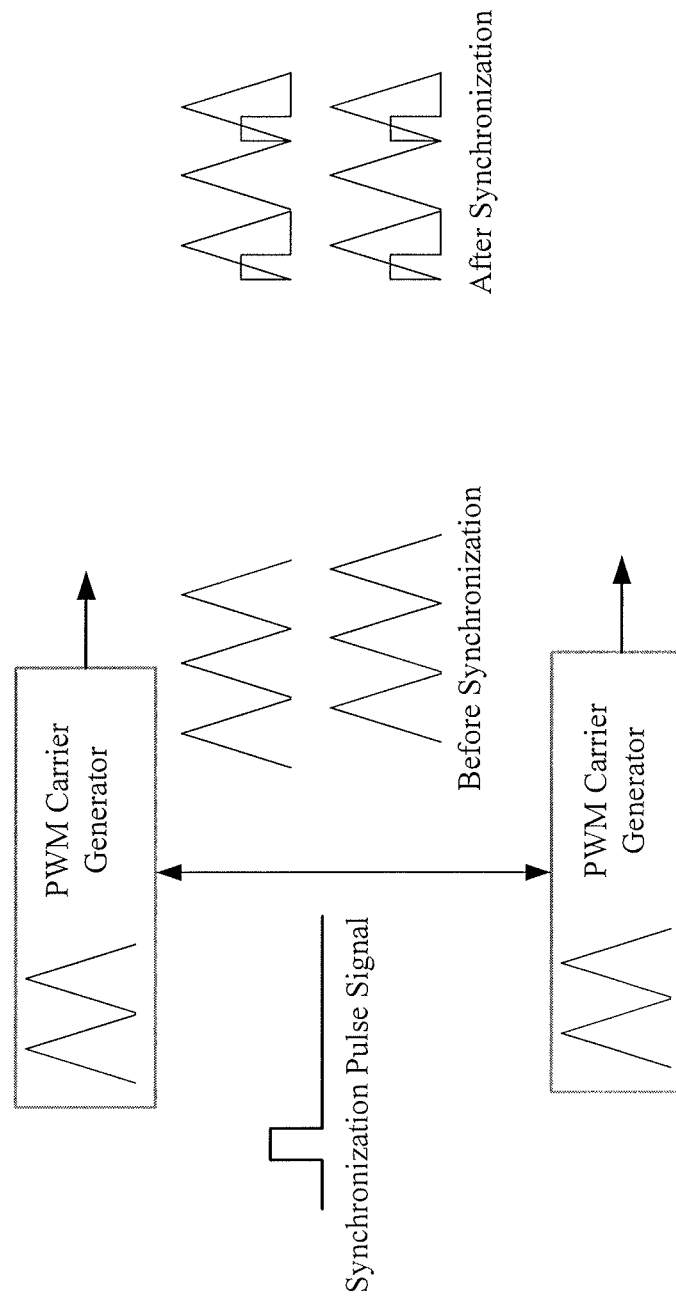
FIG. 4(b) illustrates a schematic waveform chart of the PWM carrier before and after synchronization according to another embodiment.

FIG. 4(a) illustrates a schematic waveform chart of the PWM carrier before and after synchronization according to an embodiment of the converter system of FIG. 2. FIG. 4(b) illustrates a schematic waveform chart of the PWM carrier before and after synchronization according to another embodiment of the converter system of FIG. 2.

Referring to FIG. 4(a), the period of the rectifier synchronous signal is equal to the rectifier period of the rectifiers 102 or 302. The rectifier period and the rectifier frequency are reciprocals of each other. When the original value of a timer is 0, before synchronization the carrier signal outputted by the PWM carrier generator of the controller 104 is not synchronous with that outputted by the PWM carrier generator of the controller 304. In contrast, after synchronization, through the synchronous pulse signal such as rectangular wave synchronous pulse signal, the PWM carrier signal outputted by the PWM carrier generator of the controller 104 is synchronous with that outputted by the PWM carrier generator of the controller 304. That is, the PWM carrier signal of the rectifier module 10 is synchronous with that of the rectifier module 30.

Referring to FIG. 4(b), the period of the rectifier synchronous signal is twice larger than the rectifier period of the rectifier 102 or 302. That is, the frequency of the rectifier synchronous signal is one half of the rectifier frequency of the rectifier 102 or 302. When the original value of the timer is 0, before synchronization, the carrier signal outputted by the PWM carrier generator of the controller 104 is not synchronous with that outputted by the PWM carrier generator of the controller 304. In contrast, after synchronization, since the period of the rectifier synchronous signal is extended, through the synchronous pulse signal such as rectangular wave synchronous pulse signal, at the (n+1)th time point of the rectangular wave synchronous pulse, the PWM carrier signal of the controller 104 is synchronous with that of the controller 304, and at the (n+3)th time point of the rectangular wave synchronous pulse, the PWM carrier signal of the controller 104 is also synchronous with that of the controller 304, so that the PWM carrier signal of the rectifier module 10 is synchronous with that of the rectifier module 30.

Figure 5:
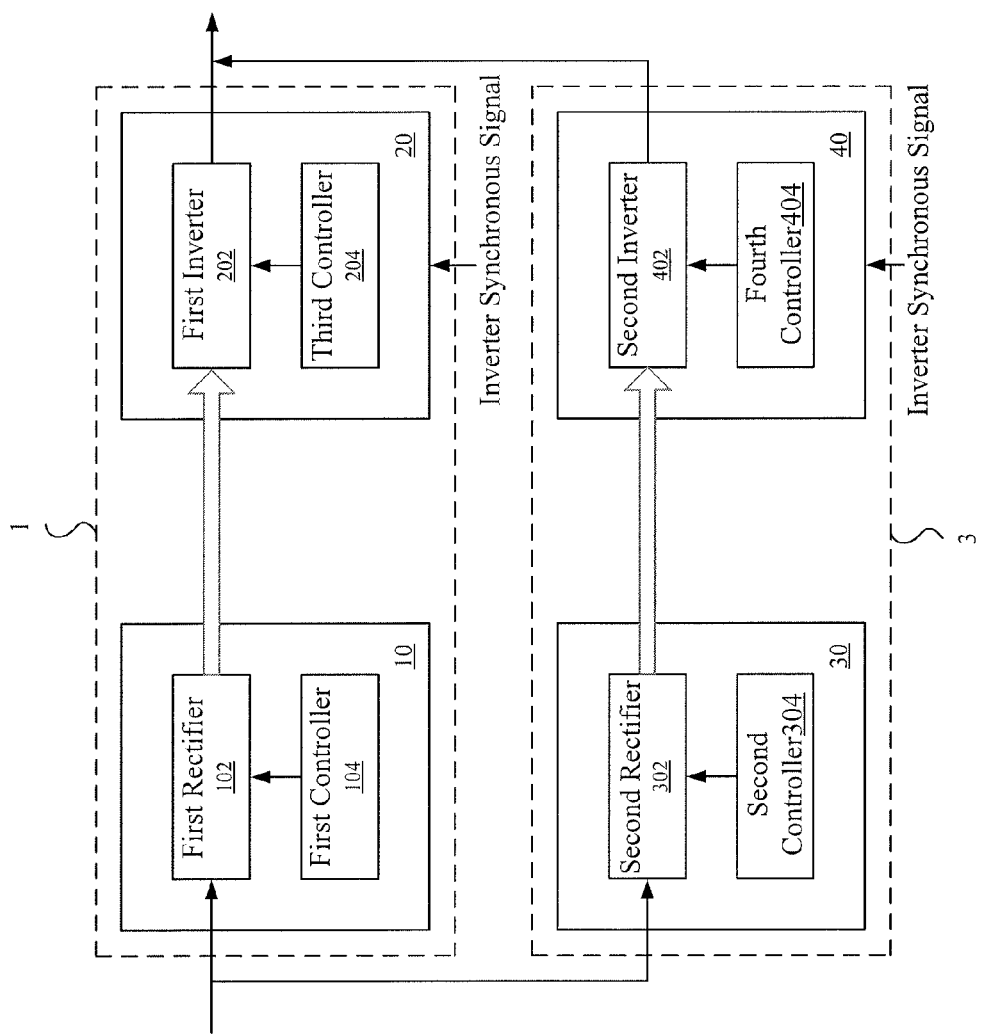
FIG. 5 illustrates a block diagram of a converter system according to an illustrative embodiment.

FIG. 5 illustrates a block diagram of a converter system according to an illustrative embodiment. The converter structure of FIG. 5 is the same as or similar to that of FIG. 1, and thus for purposes of simplicity, a description in this regard will not be repeated.

In contrast with the configuration shown in FIG. 1, in order to solve the circular current problem, in some embodiments the converter system suppresses the circular current by use of the synchronous operation of the inverters 202 and 402. For example, the converter system of the present disclosure eliminates the circulation channel therein through an inverter synchronous signal input to the side of the inverter module 20 and the side of the inverter module 40, as shown in FIG. 5.

Figure 6:
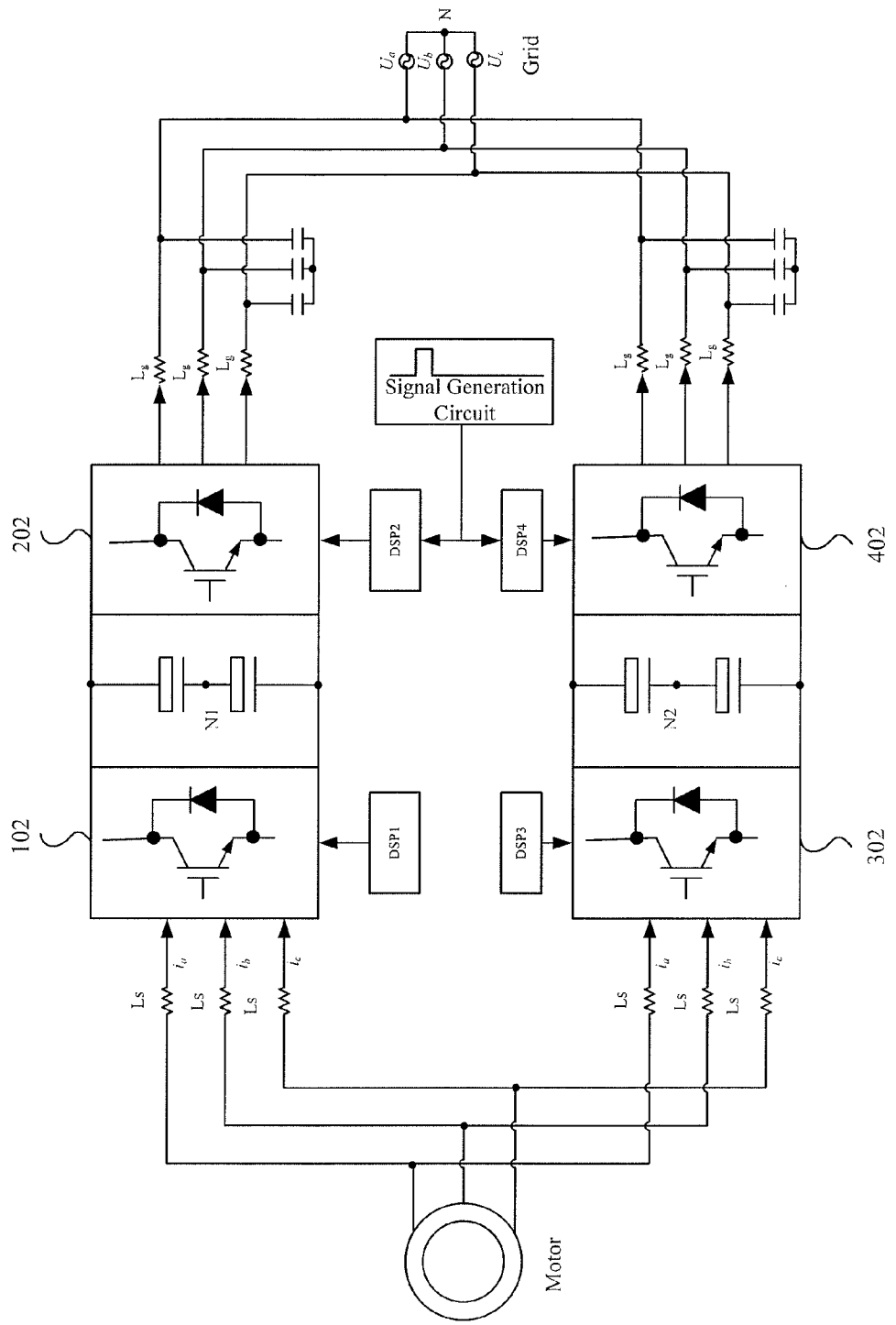
FIG. 6 illustrates a schematic circuit diagram of an embodiment of the converter system in FIG. 5.

FIG. 6 illustrates a schematic circuit diagram of an embodiment of the converter system of FIG. 5. Referring to FIG. 6, the rectifiers 102 and 302 have a rectifier frequency, and the inverters 202 and 402 have an inverter frequency. When the rectifier frequency is larger than the inverter frequency, the inverter modules 20 and 40 suppress or eliminate the circular current of the system through an inverter synchronous signal.

In an illustrative embodiment, the converter system further includes a signal generation circuit. When the rectifier frequency is larger than the inverter frequency, the signal generation circuit is used to generate the inverter synchronous signal. For example, each of the PWM carrier generator of the controller DSP2 and the PWM carrier generator of the controller DSP4 receives the inverter synchronous signal from the signal generation circuit, and thereby outputs a synchronous PWM carrier signal, such that the inverters 202 and 402 operate synchronously. In some embodiments, the signal generation circuit is a differential circuit, a 555 circuit or other circuit which can generate a synchronous pulse signal.

The signal generation circuit further includes two sub modules. One of the two sub modules is used to generate a rectifier synchronous signal, and the other is used to generate an inverter synchronous signal. Each of the two sub modules has a module enable signal. For example, when the rectifier frequency of the rectifier modules 10 and 30 is larger than the inverter frequency of the inverter modules 20 and 40, the sub module for generating the rectifier synchronous signal is disabled, and the sub module for generating the inverter synchronous signal is enabled. The converter system suppresses or eliminates the circular current through the inverter synchronous signal. Also for example, when the rectifier frequency of the rectifier modules 10 and 30 is smaller than the inverter frequency of the inverter modules 20 and 40, the sub module for generating the rectifier synchronous signal is enabled, and the sub module for generating the inverter synchronous signal is disabled. The converter system suppresses or eliminates the circular current through the rectifier synchronous signal.

In an illustrative embodiment, when the rectifier frequency is larger than the inverter frequency, the controller DSP2 or the controller DSP4 itself generates the inverter synchronous signal for suppressing the circular current. For example, the controller DSP2 generates and sends an inverter synchronous signal to the controller DSP4. Each of the PWM carrier generator of the controller DSP2 and the PWM carrier generator of the controller DSP4 outputs a synchronous PWM carrier signal according to the inverter synchronous signal, so that the inverter 202 and the inverter 402 operate synchronously. Also for example, the controller DSP4 generates and sends an inverter synchronous signal to the controller DSP2. Each of the PWM carrier generator of the controller DSP2 and the PWM carrier generator of the controller DSP4 outputs a synchronous PWM carrier signal according to the inverter synchronous signal, so that the inverter 202 and the inverter 402 operate synchronously.

Figure 7:
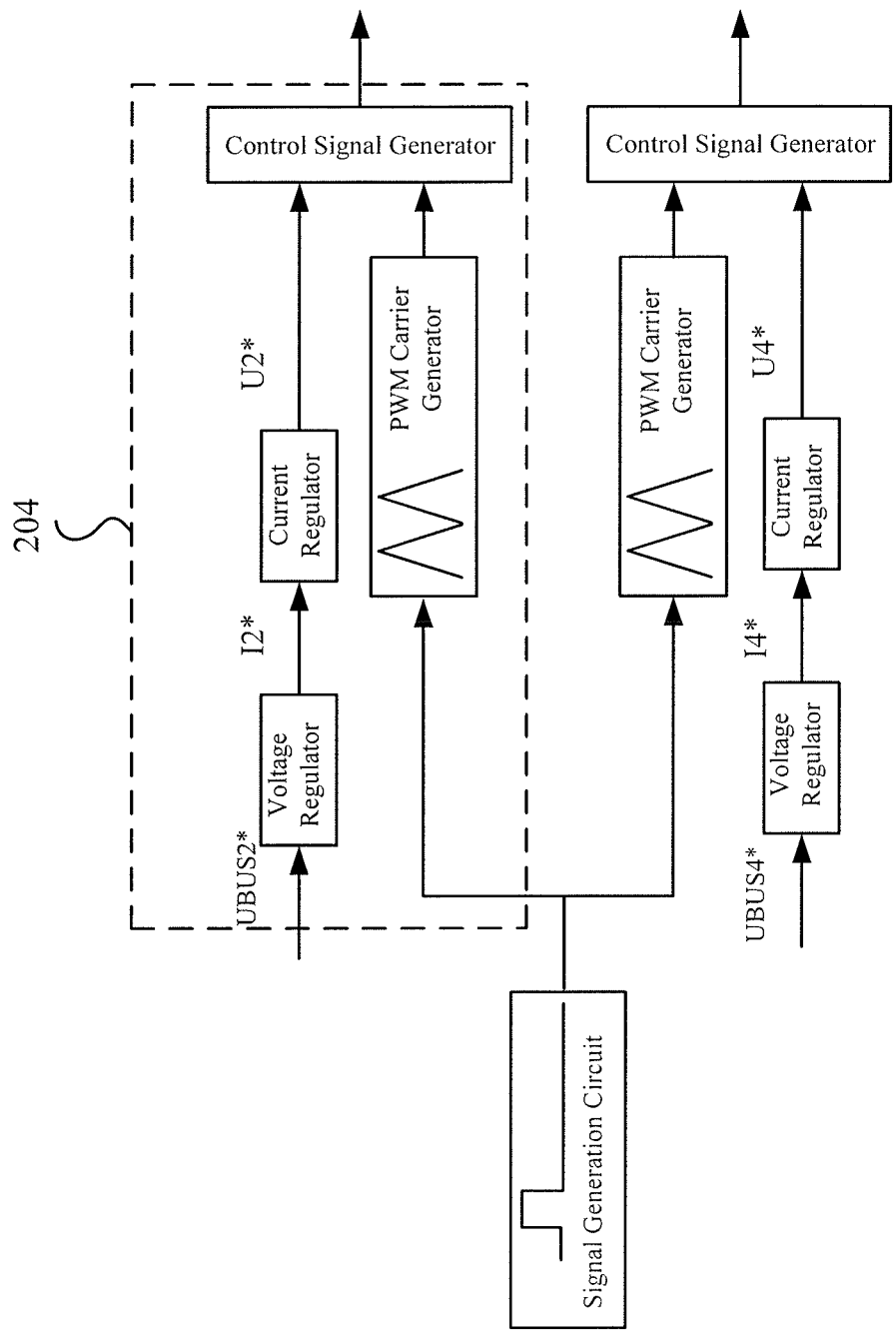
FIG. 7 illustrates a controller in an inverter module of the converter system in FIG. 6.

FIG. 7 illustrates a controller in an inverter module of the converter system in FIG. 6.

Referring to FIG. 7, the controller 204 includes a voltage regulator, a current regulator and a control signal generator. More particularly, the voltage regulator is used to receive a corresponding DC voltage (such as the first DC voltage UBUS2* of the back-to-back converter 1) and output a current reference signal I2*. The current regulator receives the current reference signal I2* and outputs a voltage reference signal U2* corresponding to the current reference signal I2*. The control signal generator has two input terminals and an output terminal. One of the two input terminals is used to receive the voltage reference signal U2* and the other is used to receive the synchronous PWM carrier signal outputted by the PWM carrier generator, and subsequently the output terminal outputs a PWM control signal. The PWM control signal is based on a comparison result between the received voltage reference signal U2* and the synchronous PWM carrier signal.

Similarly, the controller 404 includes a voltage regulator, a current regulator and a control signal generator. More particularly, the voltage regulator is used to receive a corresponding DC voltage (such as the second DC voltage UBUS4* of the back-to-back converter 3) and output a current reference signal I4*. The current regulator receives the current reference signal I4* and outputs a voltage reference signal U4* corresponding to the current reference signal I4*. The control signal generator has two input terminals and an output terminal. One of the two input terminals is used to receive the voltage reference signal U4* and the other is used to receive the synchronous PWM carrier signal outputted by the PWM carrier generator, and subsequently the output terminal outputs a PWM control signal. The PWM control signal is based on a comparison result between the received voltage reference signal U4* and the synchronous PWM carrier signal. The synchronous principle associated with the PWM carrier signal is the same as that described with reference to FIG. 4, and therefore a description in this regard will not be repeated.

Figure 8:
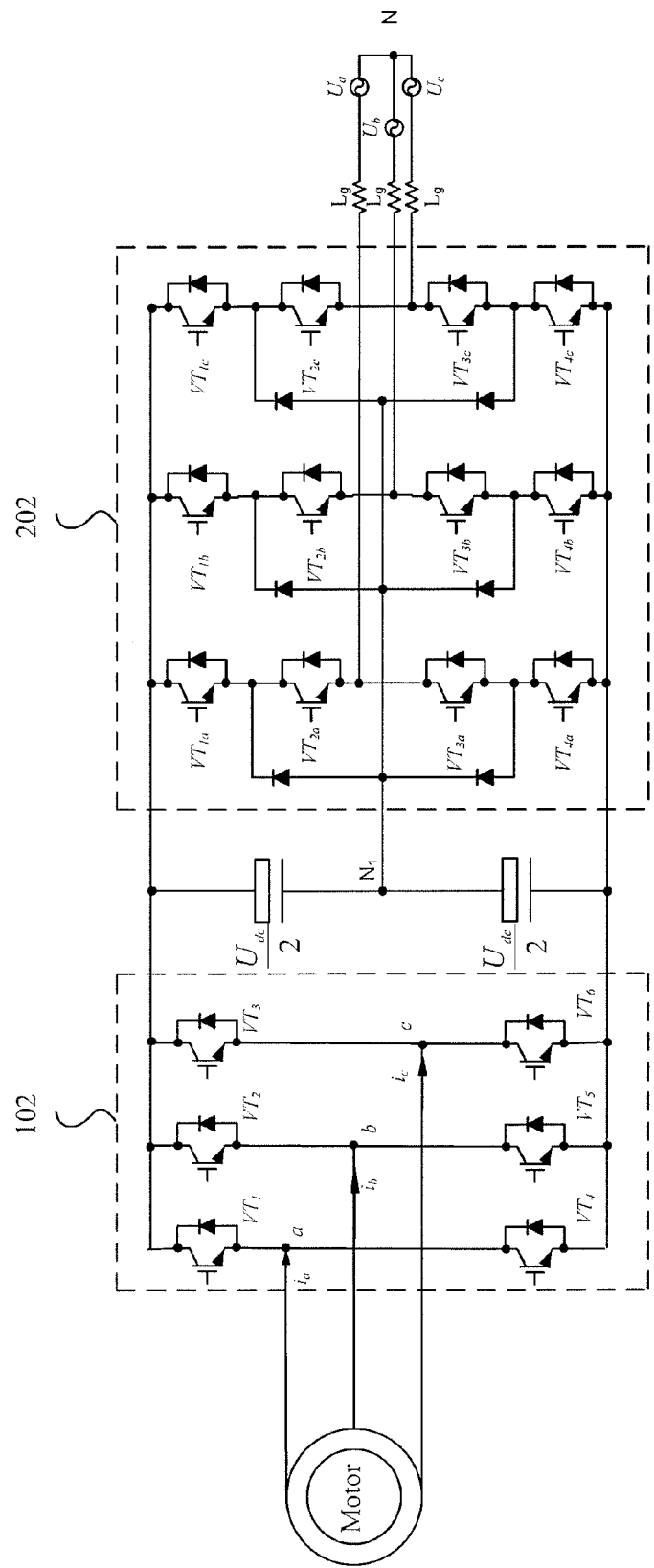
FIG. 8 illustrates a schematic circuit diagram of a converter system according to another illustrative embodiment.

FIG. 8 illustrates a schematic circuit diagram of a converter system according to another illustrative embodiment. Referring to FIG. 8, in the present converter system, the back-to-back converters 1 and 3 form an asymmetric bridge circuit. Here, the term "asymmetric bridge circuit" may refer to the level number, the power switch type and the circuit connection of the back-to-back converter 1 being different from those of the back-to-back converter 3, but the present disclosure is not limited to the above-mentioned aspects.

In one embodiment, one of the rectifier 102 and inverter 202 of the back-to-back converter 1 has a two-level structure, and the other has a three-level structure; and one of the rectifier 302 and the inverter 402 in the back-to-back converter 3 has a two-level structure, and the other has a three-level structure. For example, each of the rectifiers 102 and 302 has a two-level structure, and each of the inverters 202 and 402 has a three-level structure.

In another embodiment, in the back-to-back converters 1 and 3, the switch of the rectifier 102 is different from that of the inverter 202, and the switch of the rectifier 302 is different from that of the inverter 402. Here, "different" may refer to a difference in the type, the withstand voltage, the power level and other similar performance parameters of the switch.

In a further embodiment, in the back-to-back converters 1 and 3, the circuit connection of the rectifier 102 is different from that of the inverter 202, and the circuit connection of the rectifier 302 is different from that of the inverter 402. For example, each of the rectifier 102 and the inverter 202 has a three-level structure, but the circuit connection of the three-level structure of the rectifier 102 is different from that of the inverter 202.

Furthermore, in other embodiments, the back-to-back converters 1 and 3 form a symmetric bridge circuit. For example, each of the back-to-back converter 1 and the back-to-back converter 3 has a two-level or three-level structure. That is, each of the rectifier 102 and the inverter 202 of the back-to-back converter 1 has a two-level or three-level structure, and each of the rectifier 302 and the inverter 402 in the back-to-back converter 3 has a two-level or three-level structure.

Figure 9:
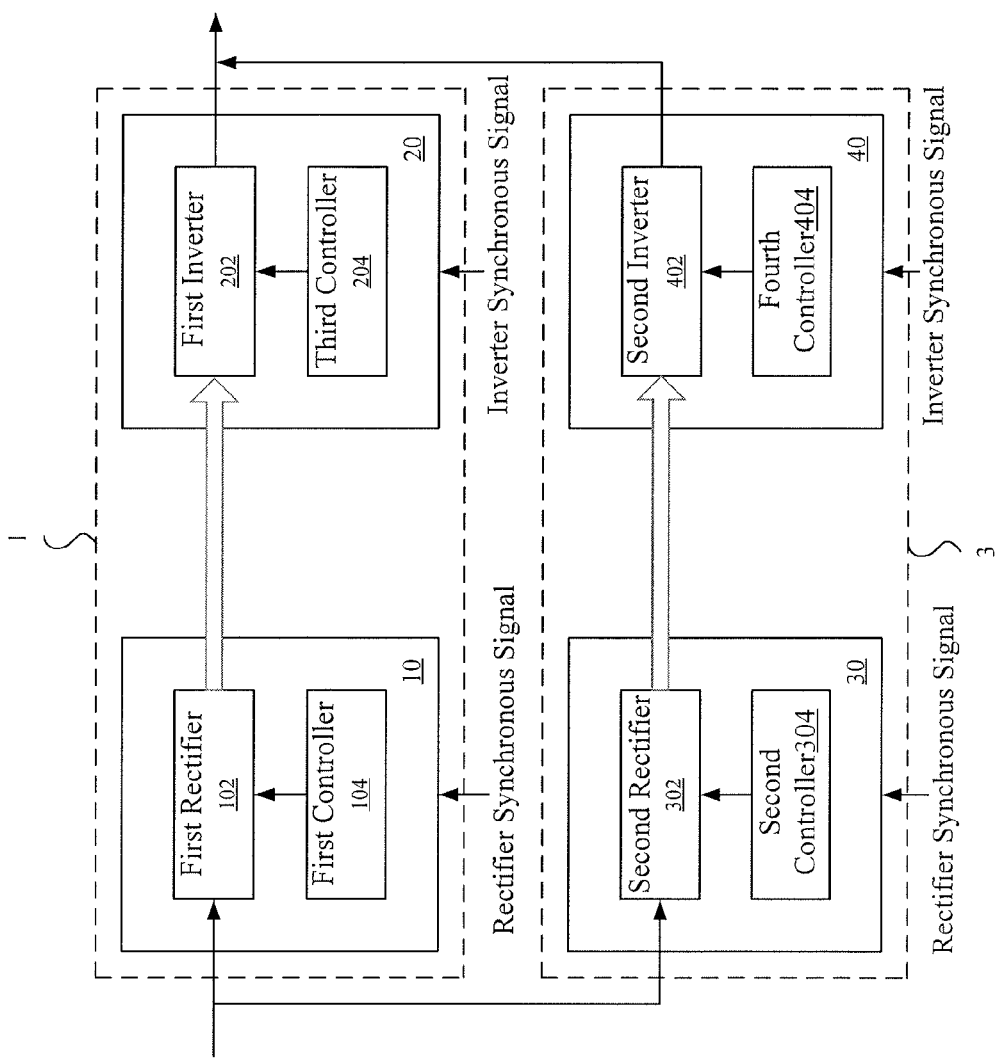
FIG. 9 illustrates a block diagram of a converter system according to a further illustrative embodiment.
Figure 10:
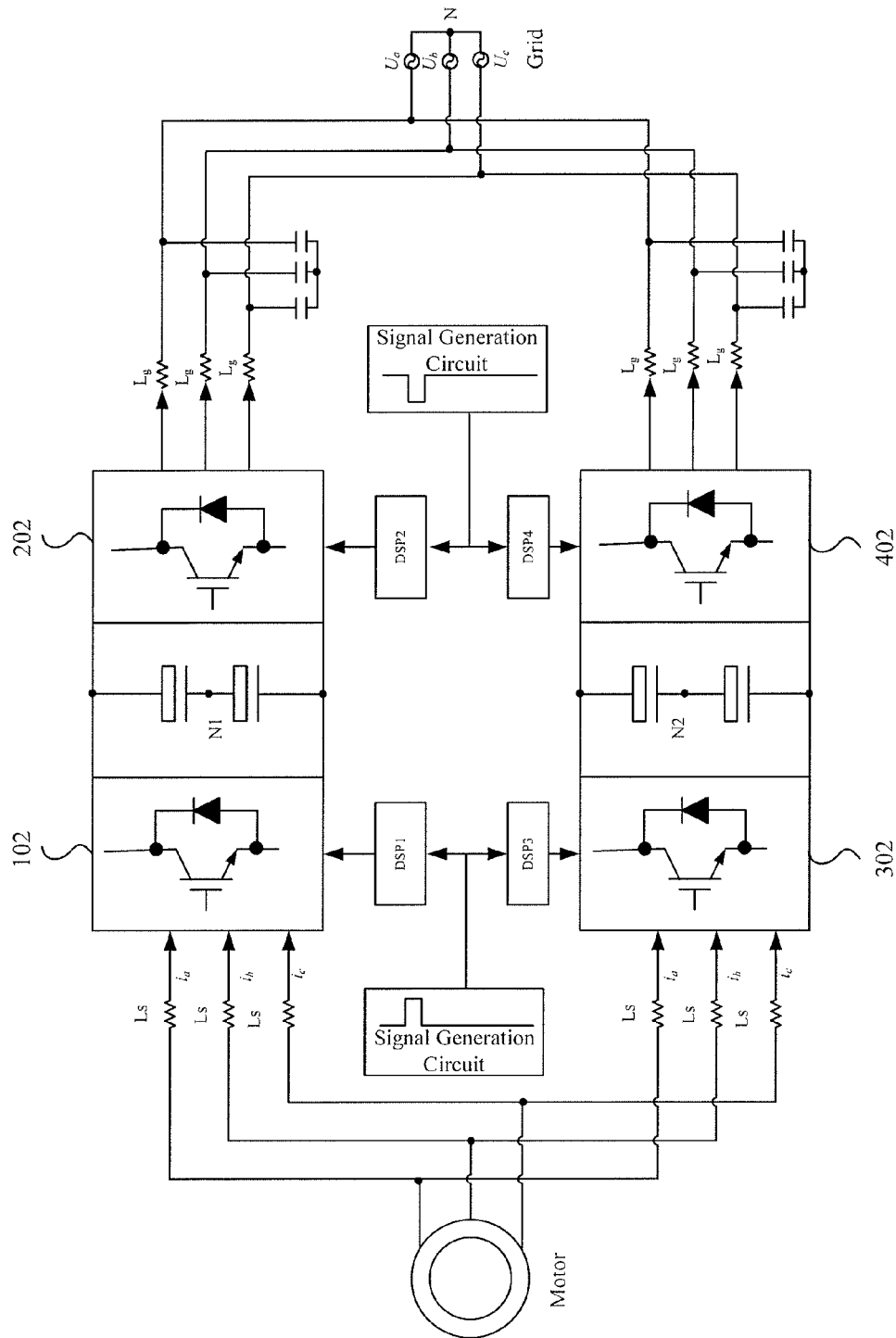
FIG. 10 illustrates a schematic circuit diagram of an embodiment of the converter system in FIG. 9.

FIG. 9 illustrates a block diagram of a converter system according to a further embodiment. FIG. 10 illustrates a schematic circuit diagram of an embodiment of the converter system of FIG. 9. Referring to both FIGS. 9 and 10, the converter system at least includes the back-to-back converters 1 and 3. The back-to-back converter 1 includes a rectifier module 10 and an inverter module 20. The back-to-back converter 3 includes a rectifier module 30 and an inverter module 40. It should be understood that in other embodiments, the converter system may include more than two back-to-back converters, and in each back-to-back converter, the AC sides of all rectifier modules are connected in parallel, and the AC sides of all inverter modules are connected in parallel.

In contrast with the configurations shown in FIGS. 1 and 5, in the converter system of FIG. 9, the rectifier 102 of the rectifier module 10 and the rectifier 302 of the rectifier module 30 operate synchronously through a rectifier synchronous signal, and moreover the inverter 202 of the inverter module 20 and the inverter 402 of the inverter module 40 operate synchronously through an inverter synchronous signal. The circular current of the system is suppressed through the synchronous operation of the rectifiers 102 and 302 as well as the synchronous operation of the inverters 202 and 402.

In some embodiments, the rectifier synchronous signal and the inverter synchronous signal are derived from the same signal generation circuit. For example, the signal generation circuit includes two sub modules. One of the two sub modules is used to generate a rectifier synchronous signal, and the other is used to generate an inverter synchronous signal.

In some embodiments, the rectifier synchronous signal and the inverter synchronous signal are derived from different signal generation circuits. For example, the first signal generation circuit is used to generate a rectifier synchronous signal, and the second signal generation circuit is used to generate an inverter synchronous signal.

Furthermore, the controller DSP1 or DSP3 itself may also generate the rectifier synchronous signal for suppressing the circular current. For example, the controller DSP1 generates and sends a rectifier synchronous signal to the controller DSP3. Each of the PWM carrier generator of the controller DSP1 and the PWM carrier generator of the controller DSP3 outputs a synchronous PWM carrier signal according to the rectifier synchronous signal, so that the rectifier 102 and the rectifier 302 operate synchronously. Also for example, the controller DSP3 generates and sends a rectifier synchronous signal to the controller DSP1. Each of the PWM carrier generator of the controller DSP1 and the PWM carrier generator of the controller DSP3 outputs a synchronous PWM carrier signal according to the rectifier synchronous signal, so that the rectifier 102 and the rectifier 302 operate synchronously.

Furthermore, the controller DSP2 or DSP4 itself may also generate the inverter synchronous signal for suppressing the circular current. For example, the controller DSP2 generates and sends an inverter synchronous signal to the controller DSP4. Each of the PWM carrier generator of the controller DSP2 and the PWM carrier generator of the controller DSP4 outputs a synchronous PWM carrier signal according to the inverter synchronous signal, so that the inverter 202 and the inverter 402 operate synchronously. Also for example, the controller DSP4 generates and sends an inverter synchronous signal to the controller DSP2. Each of the PWM carrier generator of the controller DSP2 and the PWM carrier generator of the controller DSP4 outputs a synchronous PWM carrier signal according to the inverter synchronous signal, so that the inverter 202 and the inverter 402 operate synchronously. The synchronous principle associated with the PWM carrier signal is the same as that described with reference to FIG. 4, and therefore a description in this regard will not be repeated.

By adopting the converter system structure provided by the present disclosure, a rectifier synchronous signal and/or an inverter synchronous signal are correspondingly received at the rectifier side and/or the inverter side of each back-to-back converter, so as to effectively suppress the circular current of the multiple back-to-back converters which are connected in parallel, thereby increasing the reliability of the system and reducing the cost of the system. Compared with the art, in the converter system structure provided by the present disclosure, an isolation converter is not required, so that the space occupied by the system is reduced and the power density of the system is increased.

Although the present disclosure has been disclosed with reference to the above embodiments, these embodiments are not intended to limit the present disclosure. It will be apparent to those of skills in the art that various modifications and variations can be made without departing from the spirit and scope of the present disclosure. Therefore, the scope of the present disclosure shall be defined by the appended claims.

What is claimed is:

1. A converter system comprising:
   a first back-to-back converter comprising:
      a first rectifier module comprising a first rectifier and a first controller, wherein the first rectifier has an input side and an output side so as to convert a first AC voltage to a first DC voltage, and the first rectifier is controlled by the first controller; and
      a first inverter module comprising a first inverter and a third controller, wherein the first inverter has an input side and an output side so as to invert the first DC voltage to a second AC voltage, and the first inverter is controlled by the third controller; and
   a second back-to-back converter comprising:
      a second rectifier module comprising a second rectifier and a second controller, wherein the second rectifier has an input side and an output side so as to convert the first AC voltage to a second DC voltage, the second rectifier is controlled by the second controller, and the input side of the second rectifier is connected to the input side of the first rectifier in parallel; and a second inverter module comprising a second inverter and a fourth controller, wherein the second inverter has an input side and an output side, so as to invert the second DC voltage to the second AC voltage, the second inverter is controlled by the fourth controller, and the output side of the second inverter is connected to the output side of the first inverter in parallel, wherein the first and second rectifiers have a rectifier frequency, the first and second inverters have an inverter frequency, and a circular current of the converter system is suppressed through the synchronous operation of the first and second rectifiers or through the synchronous operation of the first and second inverters.

2. The converter system of claim 1, wherein the first and second rectifiers are electrically connected to a power generator, and the first and second inverters are electrically connected to an AC grid.

3. The converter system of claim 2, wherein the power generator is a three-phase motor.

4. The converter system of claim 1, wherein the first and second rectifiers are electrically connected to an AC grid, and the first and second inverters are electrically connected to a power generator.

5. The converter system of claim 4, wherein the power generator is a three-phase motor.

6. The converter system of claim 1, wherein when the rectifier frequency is smaller than the inverter frequency, the first and second rectifier modules receive a rectifier synchronous signal so that the first and second rectifiers operate synchronously, and the period of the rectifier synchronous signal is N times the rectifier period of the first or second rectifier, wherein N is an integer and the rectifier period and the rectifier frequency are reciprocals of each other.

7. The converter system of claim 6, further comprising a signal generation circuit so as to generate the rectifier synchronous signal, wherein each of the PWM carrier generator of the first controller and the PWM carrier generator of the second controller receives the rectifier synchronous signal and outputs a synchronous PWM carrier signal.

8. The converter system of claim 7, wherein each of the first and second controllers comprises:
a power controller used to receive a parameter reflecting the AC power and output a current reference signal;
a current regulator for receiving the current reference signal and outputting a voltage reference signal; and
a control signal generator used to compare the voltage reference signal with the synchronous PWM carrier signal so as to generate a PWM control signal.

9. The converter system of claim 7, wherein the signal generation circuit is a differential circuit or a 555 circuit.

10. The converter system of claim 9, wherein each of the first and second controllers comprises:
a power controller used to receive a parameter reflecting the AC power and output a current reference signal;
a current regulator for receiving the current reference signal and outputting a voltage reference signal; and
a control signal generator used to compare the voltage reference signal with the synchronous PWM carrier signal so as to generate a PWM control signal.

11. The converter system of claim 1, wherein when the rectifier frequency is smaller than the inverter frequency, one of the first and second controllers generates and sends a rectifier synchronous signal to the other so that the first and second rectifiers operate synchronously, wherein each of the PWM carrier generator of the first controller and the PWM carrier generator of the second controller outputs a synchronous PWM carrier signal according to the rectifier synchronous signal.

12. The converter system of claim 11, wherein each of the first and second controllers comprises:
a power controller used to receive a parameter reflecting the AC power and output a current reference signal;
a current regulator for receiving the current reference signal and outputting a voltage reference signal; and
a control signal generator used to compare the voltage reference signal with the synchronous PWM carrier signal so as to generate a PWM control signal.

13. The converter system of claim 1, wherein when the rectifier frequency is larger than the inverter frequency, the first and second inverter modules receive an inverter synchronous signal so that the first and second inverters operate synchronously, and the period of the inverter synchronous signal is M times the inverter period of the first or second inverter, wherein M is an integer and the inverter period and the inverter frequency are reciprocals of each other.

14. The converter system of claim 13, further comprising a signal generation circuit so as to generate the inverter synchronous signal,
wherein each of the PWM carrier generator of the third controller and the PWM carrier generator of the fourth controller receives the inverter synchronous signal and outputs a synchronous PWM carrier signal.

15. The converter system of claim 14, wherein each of the third and fourth controllers comprises:
a voltage regulator used to receive a corresponding DC voltage and output a current reference signal;
a current regulator for receiving the current reference signal and outputting a voltage reference signal; and
a control signal generator used to compare the voltage reference signal with the synchronous PWM carrier signal so as to generate a PWM control signal.

16. The converter system of claim 14, wherein the signal generation circuit is a differential circuit or a 555 circuit.

17. The converter system of claim 16, wherein each of the third and fourth controllers comprises:
a voltage regulator used to receive a corresponding DC voltage and output a current reference signal;
a current regulator for receiving the current reference signal and outputting a voltage reference signal; and
a control signal generator used to compare the voltage reference signal with the synchronous PWM carrier signal so as to generate a PWM control signal.

18. The converter system of claim 1, wherein when the rectifier frequency is larger than the inverter frequency, one of the third and fourth controllers generates and sends an inverter synchronous signal to the other so that the first and second inverters operate synchronously, wherein each of the PWM carrier generator of the third controller and the PWM carrier generator of the fourth controller outputs a synchronous PWM carrier signal according to the inverter synchronous signal.

19. The converter system of claim 18, wherein each of the third and fourth controllers comprises:
a voltage regulator used to receive a corresponding DC voltage and output a current reference signal;
a current regulator for receiving the current reference signal and outputting a voltage reference signal; and
a control signal generator used to compare the voltage reference signal with the synchronous PWM carrier signal so as to generate a PWM control signal.

20. The converter system of claim 1, wherein the first back-to-back converter comprises a first storage unit for storing the first DC voltage, which is arranged between the first rectifier and the first inverter, and the second back-to-back converter comprises a second storage unit for storing the second DC voltage, which is arranged between the second rectifier and the second inverter.

21. The converter system of claim 20, wherein each of the first storage unit and the second storage unit is a DC bus capacitor.

22. The converter system of claim 21, wherein the DC bus capacitor of the first back-to-back converter is connected to the DC bus capacitor of the second back-to-back converter in parallel.

23. The converter system of claim 1, wherein the first back-to-back converter and the second back-to-back converter form a symmetric bridge circuit.

24. The converter system of claim 23, wherein the first back-to-back converter and the second back-to-back converter have a two-level or three-level structure.

25. The converter system of claim 1, wherein the first back-to-back converter and the second back-to-back converter form an asymmetric bridge circuit.

26. The converter system of claim 25, wherein one of the first rectifier and the first inverter in the first back-to-back converter has a two-level structure, and the other has a three-level structure; and one of the second rectifier and the second inverter in the second back-to-back converter has a two-level structure, and the other has a three-level structure.

27. The converter system of claim 25, wherein switches of the first rectifier are different from those of the first inverter, and switches of the second rectifier are different from those of the second inverter.

28. The converter system of claim 25, wherein circuit connection of the first rectifier is different from that of the first inverter, and circuit connection of the second rectifier is different from that of the second inverter.

29. A converter system comprising:
a first back-to-back converter comprising:
a first rectifier module comprising a first rectifier and a first controller, wherein the first rectifier has an input side and an output side so as to convert a first AC voltage to a first DC voltage, and the first rectifier is controlled by the first controller; and
a first inverter module comprising a first inverter and a third controller, wherein the first inverter has an input side and an output side so as to invert the first DC voltage to a second AC voltage, and the first inverter is controlled by the third controller; and
a second back-to-back converter comprising:
a second rectifier module comprising a second rectifier and a second controller, wherein the second rectifier has an input side and an output side, so as to convert the first AC voltage to a second DC voltage, the second rectifier is controlled by the second controller, and the input side of the second rectifier is connected to the input side of the first rectifier in parallel; and
a second inverter module comprising a second inverter and a fourth controller, wherein the second inverter has an input side and an output side, so as to invert the second DC voltage to the second AC voltage, the second inverter is controlled by the fourth controller, and the output side of the second inverter is connected to the output side of the first inverter in parallel,
wherein the circular current of the converter system is suppressed simultaneously through the synchronous operation of the first and second rectifiers and through the synchronous operation of the first and second inverters.

30. The converter system of claim 29, further comprising a first signal generation circuit so as to generate a rectifier synchronous signal,
wherein each of the PWM carrier generator of the first controller and the PWM carrier generator of the second controller receives the rectifier synchronous signal and outputs a synchronous PWM carrier signal, so that the first and second rectifiers operate synchronously.

31. The converter system of claim 30, wherein each of the first and second controllers comprises:
a power controller used to receive a parameter reflecting the AC power and output a current reference signal;
a current regulator for receiving the current reference signal and outputting a voltage reference signal; and
a control signal generator used to compare the voltage reference signal with the synchronous PWM carrier signal so as to generate a PWM control signal.

32. The converter system of claim 30, wherein the first signal generation circuit is a differential circuit or a 555 circuit.

33. The converter system of claim 32, wherein each of the first and second controllers comprises:
a power controller used to receive a parameter reflecting the AC power and output a current reference signal;
a current regulator for receiving the current reference signal and outputting a voltage reference signal; and
a control signal generator used to compare the voltage reference signal with the synchronous PWM carrier signal so as to generate a PWM control signal.

34. The converter system of claim 29, wherein one of the first and second controllers generates and sends a rectifier synchronous signal to the other so that the first and second rectifiers operate synchronously, wherein each of the PWM carrier generator of the first controller and the PWM carrier generator of the second controller outputs a synchronous PWM carrier signal according to the rectifier synchronous signal.

35. The converter system of claim 34, wherein each of the first and second controllers comprises:
a power controller used to receive a parameter reflecting the AC power and output a current reference signal;
a current regulator for receiving the current reference signal and outputting a voltage reference signal; and
a control signal generator used to compare the voltage reference signal with the synchronous PWM carrier signal so as to generate a PWM control signal.

36. The converter system of claim 29, further comprising a second signal generation circuit so as to generate an inverter synchronous signal,
wherein each of the PWM carrier generator of the third controller and the PWM carrier generator of the fourth controller receives the inverter synchronous signal and outputs a synchronous PWM carrier signal, so that the first and second inverters operate synchronously.

37. The converter system of claim 36, wherein each of the third and fourth controllers comprises:
a voltage regulator used to receive a corresponding DC voltage and output a current reference signal;
a current regulator for receiving the current reference signal and outputting a voltage reference signal; and
a control signal generator used to compare the voltage reference signal with the synchronous PWM carrier signal so as to generate a PWM control signal.

38. The converter system of claim 36, wherein the second signal generation circuit is a differential circuit or a 555 circuit.

39. The converter system of claim 38, wherein each of the third and fourth controllers comprises:
- a voltage regulator used to receive a corresponding DC voltage and output a current reference signal;
- a current regulator for receiving the current reference signal and outputting a voltage reference signal; and
- a control signal generator used to compare the voltage reference signal with the synchronous PWM carrier signal so as to generate a PWM control signal.

40. The converter system of claim 29, wherein one of the third and fourth controllers generates and sends an inverter synchronous signal to the other so that the first and second inverters operate synchronously, wherein each of the PWM carrier generator of the third controller and the PWM carrier generator of the fourth controller outputs a synchronous PWM carrier signal according to the inverter synchronous signal.

41. The converter system of claim 40, wherein each of the third and fourth controllers comprises:
- a voltage regulator used to receive a corresponding DC voltage and output a current reference signal;
- a current regulator for receiving the current reference signal and outputting a voltage reference signal; and
- a control signal generator used to compare the voltage reference signal with the synchronous PWM carrier signal so as to generate a PWM control signal.

\* \* \* \* \*